Figure 1:
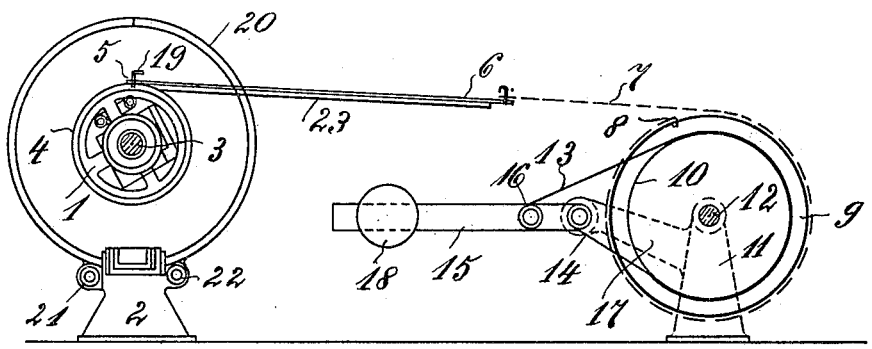

No. 830,084. PATENTED SEPT. 4, 1906.
OGNESLAW (IGNAZ) KOSZTOVITS.
APPARATUS FOR MANUFACTURING CASKS.
APPLICATION FILED JUNE 29, 1904.

Witnesses:
A. Worden[illegible]
H. D. Penney

Inventor:
Ogneslaw (Ignaz) Kosztovits.
By his Attorney;
F. H. Richards.

UNITED STATES PATENT OFFICE.

OGNESLAW (IGNAZ) KOSZTOVITS, OF KLEIN RIBATZKOE, NEAR ST. PETERSBURG, RUSSIA.

APPARATUS FOR MANUFACTURING CASKS.

No. 830,084.  Specification of Letters Patent.  Patented Sept. 4, 1906.

Application filed June 29, 1904. Serial No. 214,640.

*To all whom it may concern:*

Be it known that I, OGNESLAW (IGNAZ) KOSZTOVITS, a subject of the Emperor of Austria-Hungary, residing in Klein Ribatzkoe, near St. Petersburg, Russia, have invented certain new and useful Improvements in Apparatus for Manufacturing Casks and other Hollow Bodies or Structures, of which the following is a specification.

This invention relates to an apparatus for use in connection with the manufacture of hollow bodies—such as cases, boxes, casks, and other hollow bodies or structures of round, oval, angular, or other shape—which are formed of several layers or veneers of wood. These layers of wood are glued together by some suitable binding medium and in such a way that the grain of one layer will cross or be transverse to the grain of another layer. The single or previously-superposed glued layers of wood are bent around a bending-form corresponding to the shape of the article to be produced.

During the forming operation the body is provided with an inner and outer protective cover or mold which firmly incloses the finished article, the inner cover or mold acting as the drawing-on and drawing-off form and the outer protective cover or mold is coupled with the bending-machine. The bending-belt is fastened around the bent hollow body in order that the bent-wood plate and the bending-plate are not fastened to the bending-form, but are secured to the inner protector cover or mold, and the inner cover, bent-wood plate, and outer cover are simultaneously removed from the machine and all of the wood-plates are firmly held together under compression and in this manner thoroughly dried, so that no deformity of the wood body can take place, and after the hollow body is thoroughly dry the protective covers are removed.

An embodiment of this invention is shown in the accompanying drawings, in which—

Figure 2:
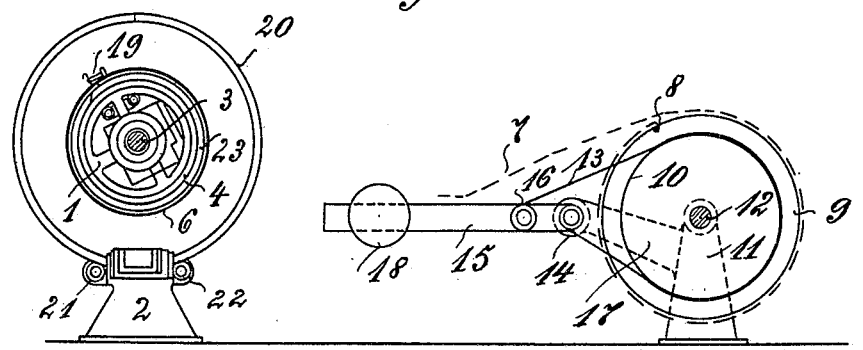
Figure 3:
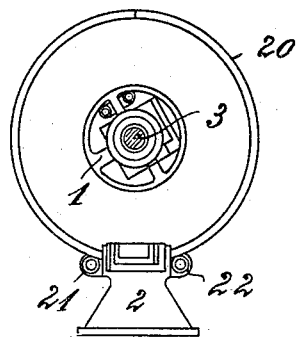
Figure 4:
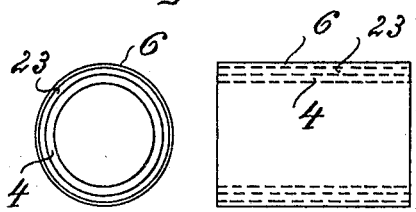

Figure 1 shows a bending-machine at the beginning of the bending or forming operation. Fig. 2 shows the wood plate and the bending-belt wound on the bending-form and the bending-belt secured together in any convenient manner. Fig. 3 shows the bending-machine after the bent-wood plate with its inner and outer protective cover or mold are removed, only the bending-form being shown on the main shaft of the machine; and Fig. 4 shows an elevation and a cross-section of the finished article in the protective covers or molds and which are not removed until the same is thoroughly dry and which prevents the deformation of the finished article.

Similar characters of reference indicate like parts in the figures.

In the present instance the bending block or former 1 is rotatably supported in a frame 2 upon a shaft 3. On the former 1 may be detachably placed a hollow mold 4, said hollow mold taking part in the rotation of the former 1, and to it is secured at 5 one end of the bending belt or band 6, the other end being secured, by means of a chain 7, to a chain-wheel 9 at 8. The wheel 9 and a band-brake wheel 10 are mounted upon a shaft 12 on a frame 11. The one end of the brake-band 13 is passed around the wheel 10 and is secured at 14 to a lever 15, the other end of the band being secured at 16 to another place of this lever. The lever is rotatably supported in the arm 17 of the frame 11 and carries a weight 18, drawing on the brake-band 13 and acting as a brake on the wheels 10 and 9 and the chain 7. The composite wood layers 23 are placed between the periphery of the mold and the band 6, so that when the mold rotates the band, together with the wood, is wound around it, the layers of wood thus being bent around the mold. After the rolling up of the layers of wood and of the band covering them around the former has been completed—that is to say, after the desired hollow body has been formed—the band is secured by means of any suitable closing device, such as hoops pushed over it or a cord tied tightly around it. The parts 19, securing it to the mold and to the chain, are then unfastened. In that state the bending-bands form a protective cover for the outer surface and the mold a protective cover for the inner surface of the hollow body. The mold 4 is then pulled off laterally from the former 1, together with the hollow body, with the band and which compresses the separate layers of wood strongly together and is completely dried in the drying-chamber. As all the layers of wood are pressed firmly one against the other, they cannot separate and the body cannot warp or become deformed. It will be seen that the bending-band is pressed against all the parts of the former with the utmost accuracy and secured in that position, so as to insure the hollow body remaining absolutely fixed in it.

The casing 20 is divided into two almost semicylindrical parts. The lower edges of these halves are rotatably mounted on the foot of the frame 2 by means of hinges 21 and 22, while the upper edges can be drawn together by means of any suitable closing device. (Not shown.) The sides can therefore be opened out to facilitate the removal of the article and mold.

As the pull on the band must vary in accordance with the kind of wood and the thickness of the layers used and frequently has to vary for the same plate at different stages of the bending, the pull at the end of the bending process having to be specially great, it is necessary to be able to regulate the tension of the band if the apparatus is to work in a reliable manner. After the layers of wood have been wound around the former and before the bending-band is secured it must be pressed with great force, and for that purpose there must be of course an adjustable counter tension. For this purpose according to this invention a brake-wheel is used, the brake-band of which can be adjusted to the desired tension by means of the weight 18. This arrangement of brake-wheel has the additional advantage that the brake-wheel remains in position after the bending has been disconnected from the former and the chain 7. Heretofore a suspended weight has been used as a retarding means to cause the binding element to properly compress the bending-strip against the mold; but this construction has the disadvantage that there is necessarily a reaction tending to unwind the strip being bent. With the present construction, in which the weight is supplanted by a friction retarding device, there is obviously no reactive tendency that would unwind the strip as soon as the rotation of the mold ceased.

Having thus described my invention, I claim—

1. An apparatus for shaping and holding in shape wooden slabs consisting of a rotatably-mounted cylindrical former, a mold attachable thereto and removable therefrom, a binding element attached to the mold and adapted during operation to conform to the shape of the article being molded, a brake-wheel for tensioning the latter during the operation, and means for governing said brake-wheel.

2. An apparatus for shaping and holding in shape wooden slabs consisting of a rotatably-mounted cylindrical former, a mold attachable thereto and removable therefrom a binding element adapted during operation to conform to the shape of the article being molded, a fastening device securing said binding element to the mold, a second fastening device on the binding element adapted after the slab has been bent round the mold to engage with the first fastening device and hold the binding element in position round the slab, a chain detachably connected with the said second fastening device and a brake-wheel for tensioning said chain.

3. In a device of the character described, the combination with the mold and the binding element secured by one end to the mold, of a friction retarding device connected with the binding element for providing tension during the winding of the binding element around the mold.

4. In a device of the character described, the combination with the mold and the binding element attached to the mold by one end, of a winding-drum, a flexible member secured to the binding element and passed around the drum, and a friction-band engaging the drum to retard its rotation by said flexible member during the unwinding of the latter.

5. In a device of the character described, the combination with the mold and the binding element attached to the mold by one end, of a winding-drum, a flexible member secured to the binding element and passed around the drum, and a friction-band engaging the drum to retard its rotation by said flexible member during the unwinding of the latter, and means for adjusting the tension of the friction-band.

6. In a device of the character described, the combination with the mold and the binding element attached to the mold by one end, of a winding-drum, a flexible member secured to the binding element by one end and passed around the drum and secured thereto by its other end, a second drum, a lever pivoted adjacent the drum, a friction-band passed around the second drum and connected with said lever and a weight adjustable on said lever to vary the tension of the friction-band on the drum.

In testimony whereof I have hereunto set my hand, in the presence of the undersigned witnesses, at Berlin, Germany, the 27th day of May, 1904.

OGNESLAW (IGNAZ) KOSZTOVITS.

Witnesses:
 HENRY HASPER,
 WOLDEMAR HAUPT.